US005479184A

United States Patent [19]
Tokumitsu

[11] Patent Number: 5,479,184
[45] Date of Patent: Dec. 26, 1995

[54] VIDEOTEX TERMINAL SYSTEM USING CRT DISPLAY AND BINARY-TYPE LCD DISPLAY

[75] Inventor: Shigenori Tokumitsu, Fukaya, Japan

[73] Assignee: Kabushiki Kaisha Toshiba, Kawasaki, Japan

[21] Appl. No.: 366,442

[22] Filed: Dec. 30, 1994

Related U.S. Application Data

[63] Continuation of Ser. No. 286,905, Aug. 8, 1994, abandoned, which is a continuation of Ser. No. 92,997, Jul. 19, 1993, abandoned, which is a division of Ser. No. 845,538, Mar. 5, 1992, abandoned, which is a continuation of Ser. No. 398,401, Aug. 25, 1989, abandoned.

[30] Foreign Application Priority Data

Sep. 6, 1988 [JP] Japan ................................. 63-223005

[51] Int. Cl.$^6$ ........................................ G09G 3/02
[52] U.S. Cl. ........................................ 345/3; 345/98
[58] Field of Search ........................... 345/3, 10, 87, 345/88, 98, 115, 201, 213, 89, 136; 395/100, 153

[56] References Cited

U.S. PATENT DOCUMENTS

| | | | |
|---|---|---|---|
| 4,286,264 | 8/1981 | Matherat | 340/744 |
| 4,679,043 | 7/1987 | Morokawa | 340/784 |
| 4,684,935 | 8/1987 | Fujisaku et al. | 340/717 |
| 4,704,697 | 11/1987 | Kiremidjian et al. | 340/717 |
| 4,751,502 | 6/1988 | Ishii et al. | 340/723 |
| 4,757,441 | 7/1988 | Buckland et al. | 340/717 |
| 4,760,387 | 7/1988 | Ishii et al. | 340/717 |
| 4,794,451 | 12/1988 | Suzuki et al. | 340/730 |
| 4,846,694 | 7/1989 | Erhardt | 340/707 |
| 4,855,728 | 8/1989 | Mano et al. | 340/805 |
| 4,899,292 | 2/1990 | Montagna et al. | 340/724 |
| 4,926,166 | 5/1990 | Fujisawa et al. | 340/717 |
| 4,965,559 | 10/1990 | Dye | 340/717 |
| 5,093,902 | 3/1992 | Tokumitsu | 395/100 |

Primary Examiner—Richard Hjerpe
Assistant Examiner—Xiao M. Wu
Attorney, Agent, or Firm—Cushman, Darby & Cushman

[57] ABSTRACT

In a videotex terminal system, image data has a code frame and a photo frame, and each of these frames includes dot pattern data, foreground color data, background color data, and flashing data. This type of image data can be simultaneously displayed on both a cathode ray tube display (CRT) and a liquid crystal display (LCD). These two displays are not controlled independently of each other; rather, they are controlled in association with each other by a display control unit to eliminate the need to use a complicated software program in a central processing unit (CPU) and to reduce the number of hardware components required by the system. The display control unit is particularly advantageous in that is can easily discriminate the code frame and the photo frame from each other, and it enables the system to execute a reliable display operation.

5 Claims, 8 Drawing Sheets

VIDEOTEX TERMINAL SYSTEM USING CRT DISPLAY AND BINARY-TYPE LCD DISPLAY

This is a continuation of application Ser. No. 08/286,905, filed on Aug. 8, 1994, which was abandoned upon the filing hereof which was a continuation of 08/092,997 filed Jul. 19, 1993, now abandoned, which was divisional of Ser. No. 07/845,538 filed Mar. 5, 1992, now abandoned, which was an FWC of Ser. No. 07/398,401 filed Aug. 25, 1989, now abandoned.

BACKGROUND OF THE INVENTION

1. Field of the Invention

The present invention relates to a display control device for an image display system, and more particularly to a display control device for use in an image display system having an image memory, for instance, a videotex system such as the CAPTAIN or NAPLPS system, which stores transmitted image data in the image memory and reads the image data out of the image memory in sequence to display it on a display device.

2. Description of the Related Art

In a videotex system adapted for information delivery services using telephone lines, a cathode ray tube (CRT) of a television receiver is generally used as a display device for displaying transmitted information visually.

In recent years liquid crystal display devices (LCDs) have widely been used as display devices for electronic equipment. The LCDs are classified into active-matrix type LCDs used with liquid crystal television receivers and binary image type LCDs used with word processors and personal computers. The binary image type LCDs have, for example, 640×400 pixels each having two display states of on and off.

A liquid crystal television receiver using the active-matrix type LCDs can display images in colors and gradations like CRT display devices and may be used as display devices for the videotex because of provision of video interface. On the other hand, the binary image type LCDs are not currently in use as display devices for videotex. The reasons therefor may include the following two:

(1) Image data used in the videotex system is composed of dot pattern data and color data and a frame is composed of two frames of a code frame and a photo frame. To display images on the binary image type LCDs by using the image data for the videotex, predetermined data conversion processes would be required.

(2) The CRT and the binary image type LCD require different driving methods.

In view of the fact that equipment using the binary image type LCDs is widely used, the use of the binary image type LCDs as display devices for the videotex system should be considered.

However, in using the binary type LCDs as display devices for the videotex the following two problems must be taken into consideration.

A first problem may arise in constructing a videotex system which can use both active matrix type LCDs (or CRTs) and binary type LCDs. That is, if a display control device capable of controlling such different types of display devices simultaneously were constructed, a separate display control section would generally be provided for each of the display devices. More specifically, a display control section for an active matrix type LCD (or CRT) and a display control section for a binary type LCD would separately be connected to a central processing unit (CPU) for performing data processing such as data conversion on image data transmitted from an information center.

With such a construction, however, software used with the CPU would become complex because the CPU would have to carry out different data conversion for two types of display devices. In hardware as well, the provision of two separate display control sections would increase circuit scale.

Next, a second problem may arise from the fact that the frames in the videotex system comprise two types of frame, one for code and the other for photo as described above, while the frames that the binary type LCDs handle comprise only one type of frame, and moreover the binary type LCDs can accommodate only dot pattern data indicative of brightness. That is, when dot pattern data of both of a code frame and a photo frame are displayed one above the other on a binary type LCD, they may not be distinguished from each other. This problem will arise both in the case where a videotex system that can accommodate the active matrix type LCDs (or CRTs) and the binary type LCDs is constructed and in the case where videotex system that can accommodate only the binary type LCDs is constructed.

As described above, in the art of videotex systems, the development of a display control device is desired which is adaptable to two types of display devices, such as an active matrix type LCD (or CRT) and a binary type LCD, which are different from each other in image data structure and driving method. In this case there arise problems of complexity of software used and an increase in amount of hardware used. In addition, there is a problem of how to discriminate between a code frame and a photo frame in displaying image data of videotex on a binary type LCD.

SUMMARY OF THE INVENTION

It is accordingly an object of the present invention to provide a new and improved display control device for an image display system which accommodates two types of display devices with simplified software and a small amount of hardware.

It is another object of the present invention to provide a display control device which allows any type of display device to discriminate between two display frames, such as a code frame and a photo frame, which are necessary to display images.

According to an aspect off the present invention there is provided a display control device comprising:

first memory means;

second memory means; and display control means comprising (a) means for storing first data adapted to a predetermined display device in said first memory means;

(b) means for reading the first data from said first memory means on a time division basis in sync with predetermined timing of display;

(c) means for converting the first data read out of said first memory means to second data adapted to a display device different from said predetermined display device;

(d) means for storing the second data in said second memory means; and (e) means for reading the data stored in said second memory means out of said second memory in accordance with timing of display which is different from the predetermined timing of display.

Such an arrangement as described above can accommodate two different types of display devices with the aid of simple software and a small amount of hardware.

According to another aspect of the present invention, in order to control two types of display devices with simple software and a small amount of hardware, the present invention comprises an image memory, data conversion means, data writing means and data readout means for each of the display devices and is arranged such that, for display control of a first type of display device, incoming image data is converted to desired data by the data conversion means and then written into the image memory by the data writing means, the data stored in the image memory is read out in sync with the timing of display of the corresponding display device by the data readout means, and, for display control of to a second type of display device, the data read out of the image memory for the first type of display device is converted to desired data by the data conversion means in sync with the timing of readout and then written into the image memory in accordance with the readout address of the image memory for the first type of display device, and the data stored in the image memory is read out in accordance with the timing of display of the second type of display device.

With such an arrangement, control sections for the respective display devices are provided not totally independently but in a partially associated manner. Thus, complication of software and an increase in amount of hardware can be prevented.

That is, where a CPU is used as the means for converting incoming image data to image data for storage in the image memory, the CPU has only to carry out only the data conversion process for the first type of display device. Thus, the software for the CPU may be substantially the same as that used with a conventional display control device using only a CRT or active matrix type LCD. Although two types of display devices are handled, the software may be simple.

Since the display readout address for the first type of display device is used as the write address for the second type display device, the need for write address generating means for the second type of display device is eliminated. The amount of hardware can be reduced as compared with a case where the write address generating means is provided for each of the two types of display devices.

Since the data conversion process by the CPU is performed only for the first type of display device, a section for monitoring the data conversion state may be provided only on the side of the first type of display device. The amount of hardware can thus be reduced as compared with a case where the monitoring section is provided for each of two types of display devices.

Furthermore, where a facility for erasing the image data stored in the image memory with hardware is provided, since data read out of the image memory for the first type of display device is written into the other image memory for the second type of display device, erasing of the image data stored in the image memory for the first type of display device will result in erasing data stored in the image memory for the second type of display device. Hence, hardware erasing means may be provided only on the first type of display device. The amount of hardware can be reduced as compared with the case where hardware erasing means is provided for each of two types of display devices.

According to still another aspect of the present invention, in order to identify two display frames, the invention first reads from image memory, for the first display frame, brightness data in the present display position and surrounding positions adjacent to the present display position and, for the second display frame, brightness data in the present display position, next decides whether or not the brightness data in the surrounding positions adjacent to the present display position for the first display frame have brightness, masks the brightness data in the present display position for the second display frame when they have brightness, and finally combines the masked output and the brightness data in the present display position for the first display frame.

With such an arrangement, since the brightness data for the second display frame surrounding the brightness pattern of the first display frame is masked, the brightness pattern is fringed, thus allowing the two display frames to be identified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constituted a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENT

Preferred embodiments of the present invention will now be described in detail with reference to the accompanying drawings.

Reference will now be made in detail to the presently preferred embodiments of the invention as illustrated in the accompanying drawings, in which like reference characters designate like or corresponding parts throughout the several drawings.

Figure 1:
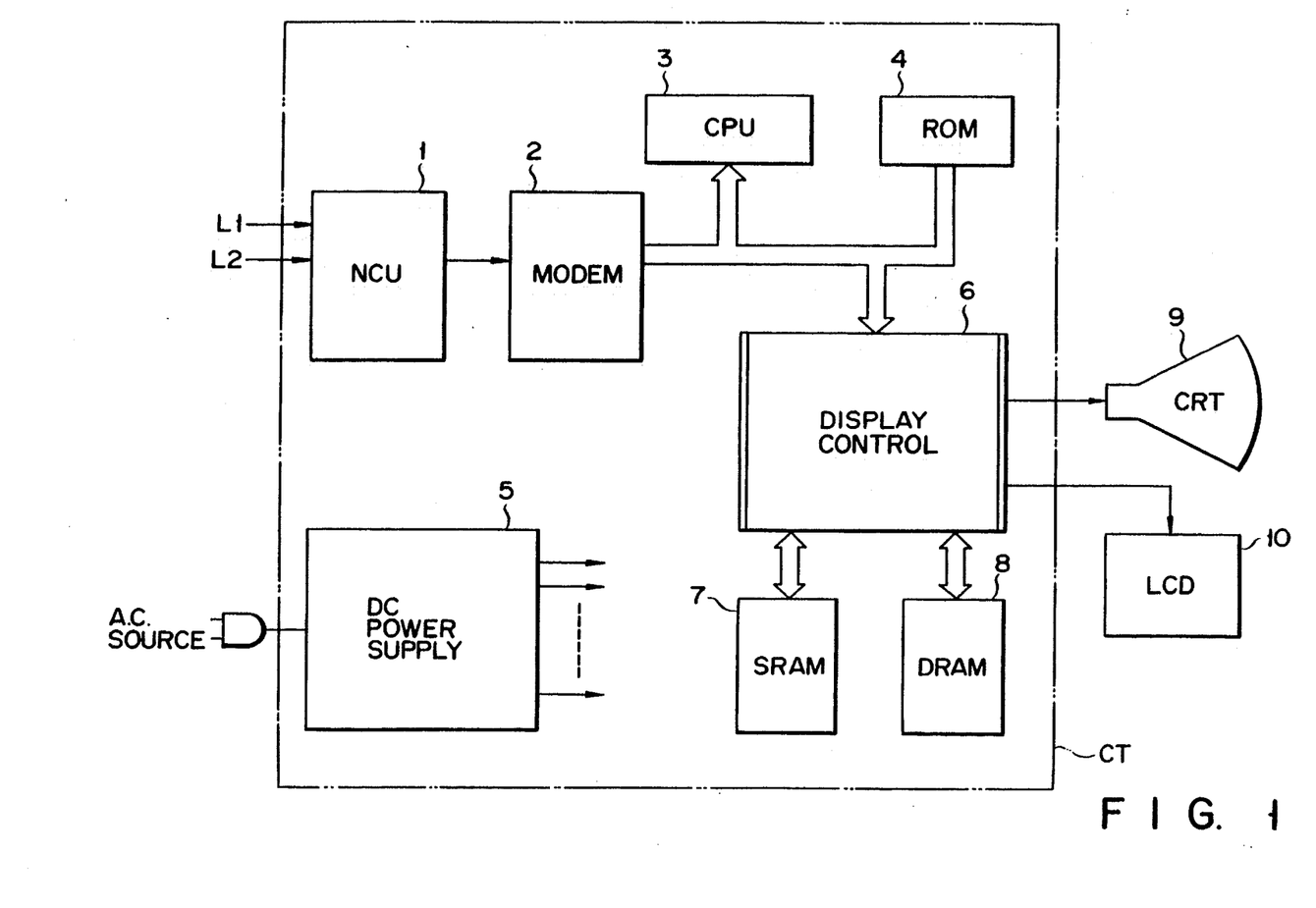
FIG. 1 is a block diagram of a display control device embodying the present invention.

Referring now to FIG. 1, there are shown a schematic arrangement of a videotex terminal CT including a display control device embodying the present invention and connection thereof to two types of display devices 9 and 10.

The embodiment of the present invention will be outlined here on the basis of the flow of data within videotex terminal CT with reference to FIG. 1.

In FIG. 1, a data signal transmitted over telephone lines L1 and L2 is applied to a bi-directional communication modulator/demodulator (MODEM) 2 via a network control unit (NCU) 1 for conversion from an analog signal to a digital signal. A central processing unit (CPU) reads data from modem 2 to decode it according to videotex protocol and writes the decoded image data into a static random access memory (SRAM) 7 through a display control section 6.

Display control section 6 reads image data for a code frame and a photo frame from SRAM 7 in accordance with the display timing of a cathode ray tube (CRT) 9 to synthesize them into one frame of image data and convert them to R, G and B signals for application to CRT 9. Concurrently display control section 6 converts and synthesizes dot pattern data for a code frame and a photo frame to data for a binary type LCD and writes it into a dynamic random access memory (DRAM) 8. In this case writing data into DRAM 8 is performed asynchronously with the display timing of a liquid crystal display (LCD) 10 using cycle steal. On the other hand, display control section 6 reads display data for binary type LCDs from DRAM 8 for decoding in accordance with the display timing of binary type LCD 10 and supplies the decoded data to LCD 10.

In FIG. 1, reference numeral 4 denotes a read only memory (ROM) for storing software for the videotex terminal, and 5 denotes a DC power supply for generating various DC voltages for the above sections 1 to 10.

As can be seen from the foregoing, from the standpoint of software, this embodiment is required only to write image data into SRAM 7 so as to allow display data to be applied to CRT 9 and LCD 10 in real time. Thus the burden imposed on software does not increase.

Figure 2:
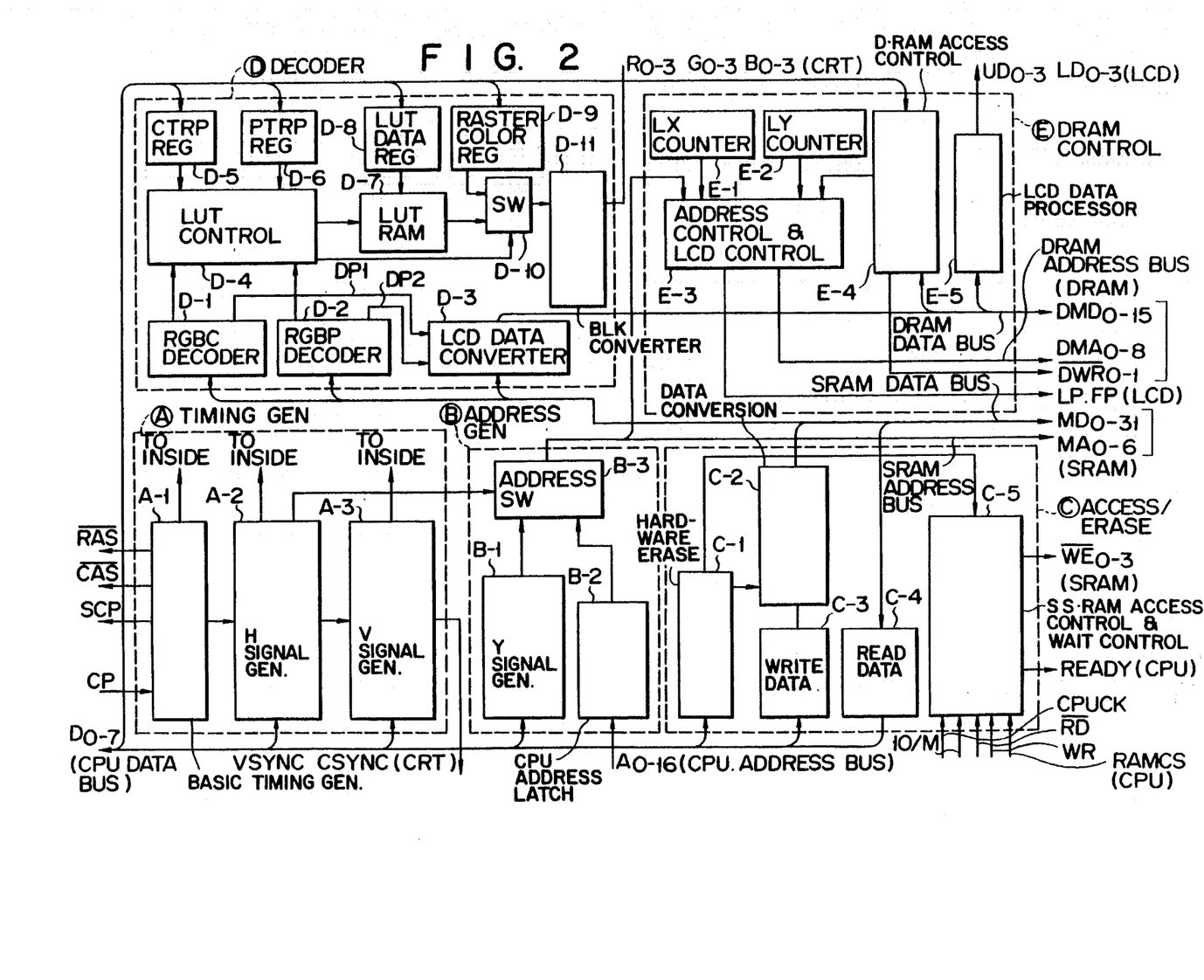
FIG. 2 is a block diagram of the display control section of FIG. 1.

Referring now to FIG. 2, display control section 6 is functionally divided into five sections (A), (B), (C), (D) and (E).

Figure 3:
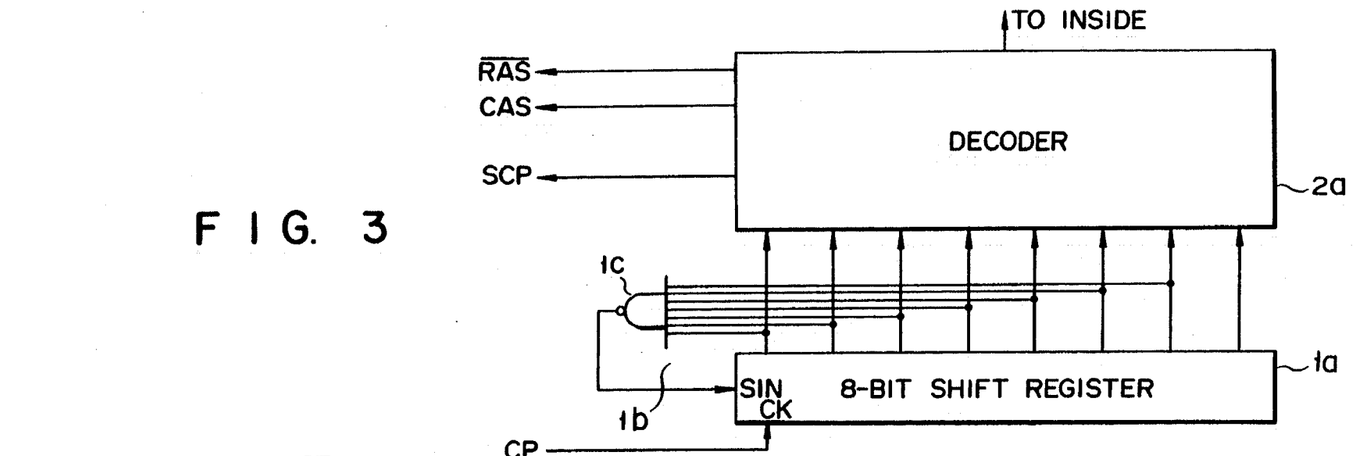
FIG. 3 is a schematic diagram of the basic timing generating section of FIG. 2.

Section (A) is a timing generating section which is composed of a basic timing generating subsection (A-1) for generating basic timing signals, an H signal generating subsection (A-2) for generating various timing signals including a horizontal sync signal (H.SYNC) and a vertical sync signal (V.SYNC) for CRT 9, and a V signal generating subsection (A-3). More specifically, basic timing generating subsection (A-1) produces basic timing signals for CRT 9 and LCD 10 and, as shown in FIG. 3, is comprised of a ring counter 1a, consisting of an 8-bit shift register 1b receiving a basic clock CP and a NAND circuit 1c, and a decoder 2a for providing various timing signals to the inside and the outside of the display control section.

Section (B) is an address generating section for providing addresses of SRAM 7, which comprises a Y address generating subsection (B-1) for generating addresses along a vertical line of a display screen, a CPU address latch subsection (B-2) for latching addresses (A0-16) from CPU 3 used when CPU 3 writes data into or reads data from SRAM 7, and an address switching subsection (B-3) for providing data addresses on a time division basis.

Y address generating subsection (B-1) outputs Y addresses of a code frame and a photo frame separately. This is because the photo frame is scrolled vertically in the videotex system. X addresses, which are addresses along a horizontal line of the display screen, are applied from H signal generating subsection (A-2) to address switching subsection (B-3).

Here image data necessary for the videotex system comprise dot pattern data DP1, foreground color data FG1, background color data BG1 and flashing data for a code frame (those data are simply abbreviated to DP1, FG1, BG1 and DA1 hereinafter), and dot pattern data DP2, foreground color data FG2, background color data BG2 and flashing data DA2 for a photo frame (those data are abbreviated to DP2, Fg2, BG2 and DA2 hereinafter). There are further required dot pattern data DP1B and DP1A and flashing data DA1B and DA1A of a code frame for lines one line before and after the present line (hereinafter abbreviated to DP1B, DA1B: one line before, and DP1A and DA1A: one line after) so as to define the boundaries the code frame and the photo frame displayed on LCD 10 as will be described later. Hence display control section 6 has to read 12 types of data from SRAM 7 for image display on LCD 10. Access to SRAM 7 from CPU 3 also must be performed at regular intervals.

Assuming that LCD 10 has 640×400 pixels, it can accommodate a double density display. Since 496×408 pixels are required for double density display, LCD 10 is short by 8 pixels in the number of pixels along a vertical line. This can be solved by setting the number of pixels of a header not to 24 pixels which are general in the CAPTAIN (character and pattern telephone access information network) system but to 16 pixels. Hence the present embodiment is directed to the double density display adapted to rank 3 of the videotex system. Taking a double scan monitor which is double the frequency of the NTSC system as CRT 10 for double density display, the frequency of display clock (basic clock) CP will be 32/5 fsc (about 43 nsec). SRAM 7 may be a commercial available static random access memory having an access time of 85 nsec. Then an access time for one piece of data may be set to a period of time (about 87 nsec) which is double the cycle period of display clock CP. For efficient utilization of the memory the above data require reading on a time division basis. For further securing the access time which is double the cycle period of display clock CP in addition to the fact that 12 types of display data are required and access by CPU 3 is made at a predetermined cycle, it is most desirable that the data bus of SRAM 7 have 32 bits (MD0-31).

Figure 4:
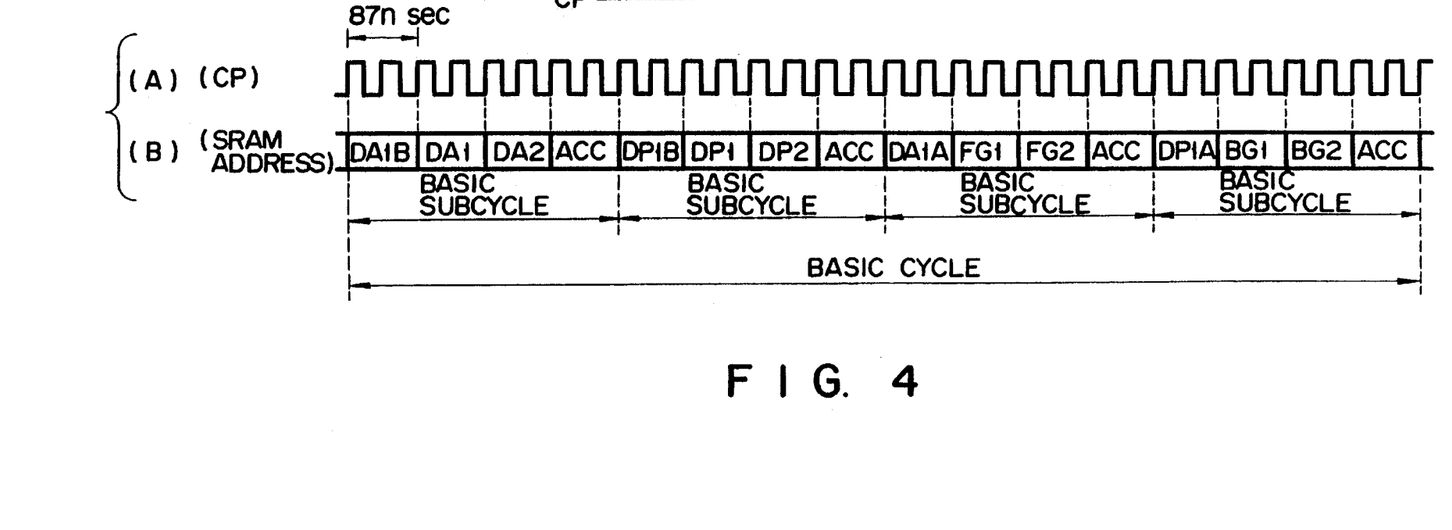
FIG. 4 is a timing diagram explanatory of the operation of the display control section.

FIG. 4 shows a relationship between a basic cycle and basic subcycles for SRAM 7 in the case of a 32-bit data bus. ACC represents a period in which an address used by CPU 3 to access SRAM 7 is output, which is referred to as an ACC period hereinafter. DA1B, DA1, DA2, . . . and so on represent periods in which addresses for respective pieces of data of the code and photo frames are output. The basic cycle of SRAM 7 is composed of four basic subcycles generated by basic timing generating section (A-1). In a double scan mode, one horizontal cycle comprises cycles of 728 display clocks CP. Thus one horizontal cycle is composed of 91 basic subcycles.

Referring back to FIG. 1, the (C) section is an access/erase section including a subsection adapted to perform access control when CPU 3 writes data into or reads data from SRAM 7 and a subsection adapted to erase a displayed frame by means of hardware. More specifically, hardware erase subsection (C-1) is responsive to application from CPU 3 thereto of a command for erasing a displayed frame such as a code frame or a photo frame to initiate erasing the displayed frame. The hardware erasing is carried out by using display addresses output from address generating section (B). Hardware erase subsection (C-1) drives data converting subsection (C-2) to output erasing data onto SRAM data bus (MD0-31) and drives SRAM access control & WAIT control subsection (C-5) to provide write pulses (WE0-3) while address generating section (B) generates display addresses for pieces of data.

Write data register (C-3) is adapted to hold write data which is written into SRAM 7 by CPU 3. When write data register (C-3) is loaded with write data via CPU data bus D0-7, the data is written into SRAM 7 via SRAM data bus MD0-31 during an ACC period shown in FIG. 4. The write pulses used at this point are supplied from SRAM access control and WAIT control subsection (C-5). The addressing of SRAM 7 is carried out by outputting a CPU address held by CPU address latch (B-2) onto SRAM address bus MA0-4. Read data register (C-4) is adapted to store read data which is read from SRAM 7 by CPU 3.

SRAM access control & WAIT control subsection (C-5) is adapted to control writing into and reading from SRAM 7 by CPU 3 SRAm access control & WAIT control subsection (C-5) receives various control signals from CPU 3, such as a clock (CPUCK) of CPU 3, an identification signal (IO/M) for identifying an IO area and a memory area, a read signal (RD), a write signal (WR) and a signal (RAMCS) for indicating an address space of SRAM 7, detects CPU access to SRAM 7, applies a READY signal to CPU 3 and causes it to enter the wait state so that SRAM 7 may be accessed during a predetermined ACC period. SRAM access control & WAIT control subsection also provides four write signals WE0-3 to be applied to SRAM 7.

The (D) section is a decoder section which decodes image data for photo and code frames read out of SRAM 7 for synthesis into one frame of image data and conversion to R, G and B signals. R, G and B signals are converted to four bit digital data R0-3, G0-3 and B0-3 by a color lookup table RAM (referred to as LUTRAM hereinafter) and then converted to analog signals by an D/A converter not shown for application to CRT 9.

RGBC decoder (D-1) is an RGB decoder for a code frame adapted to decode DP1, DA1, FG1 and BG1 read out onto SRAM data bus D0-31 from SRAM 7 by CPU 3 and provides an 4-bit entry address to LUT control subsection (D-4). At the same time decoder (D-1) provides dot pattern data DP1 of a code frame (for the current line) to a LCD data converter (D-3). RGBP decoder (D-2) is a RGB decoder for a photo frame adapted to decode DP2, DA2, FG2 and BG2 read out onto SRAM data bus D0-31 from SRAM 7 by CPU 3 and provides a 4-bit entry address to LUT control subsection (D-4). At the same time decoder (D-2) provides dot pattern data DP2 of a photo frame (for the current line) to a LCD data converter (D-3).

CTRP register (D-5) and PTRP register (D-6) are adapted to specify which of the entry addresses become transparent and store transparent data of code and photo frames, respectively, which are supplied from CPU 3 via CPU data bus D0-7. The entry addresses from decoders (D-1) and (D-2) and the transparent data stored in registers D-5 and D-6 are applied to LUT control subsection D-4. LUT control subsection D-4 decides the transparent of a code frame according to the predetermined priority and supplies either entry addresses of the code frame or those of the photo frame to LUTRAM D-7. That is, if the code frame is not transparent, the entry address of the code frame is selected. If the code frame is transparent, on the other hand, the entry address of the photo frame is selected. LUTRAM D-7 provides R, G and B data each of 4 bits corresponding to the entry address. The R, G and B data are applied to a switch subsection D-10 which selects either the R, G and B data or R, G and B data for a raster color for application to a BLK converter D-11. A switch signal to select either the R, G and B data from LUTRAM D-7 or the raster R, G and B data is provided froth LUT control subsection D-4. In response to the switch signal switch subsection D-10 selects the raster R, G and B data when the code frame and the photo frame are both transparent or when they are out of the display area.

Finally, BLK converting subsection D-11 converts the R, G and B data to all 0s during a blanking interval and outputs them as R0-3, G0-3 and B0-3. LUT data register D-8 is a register which is loaded with write data when CPU 3 writes it into LUTRAM D-7. Raster color register D-9 is a register which stores R, G and B data (each of 4 bits) of a raster which is out of the display area.

LCD data converting subsection D-3 is adapted to produce display data for LCD 10 from dot pattern data of code and photo frames read out of SRAM 7 to display an image on CRT 9. Here an LCD having two states of ON and OFF is used as LCD 10. Hence, in order to display data for use in the videotex system having two types of frames on binary type LCD 10, the data requires some processing. The videotex system has color data as well as dot pattern data of pixel information. Taking the fact that the videotex system is a system for receiving information into consideration, only dot pattern data of each of the code and photo frames will allow information to be visually displayed. Therefore, the identification of each of two types of frames is left to consideration.

Figure 5A:
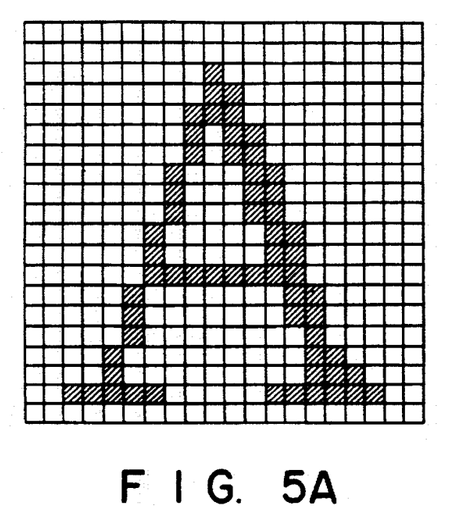
FIGS. 5A to 5D are diagrams illustrating the operation of the display control section.
Figure 5B:
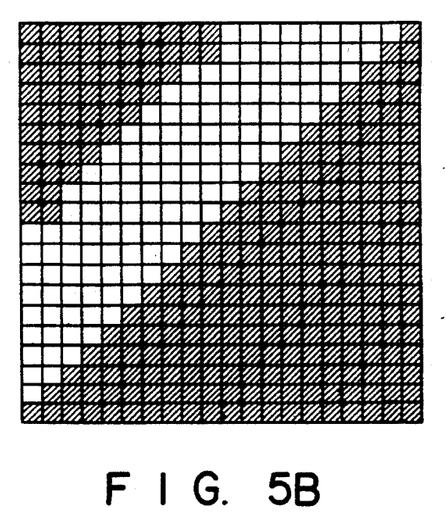
Figure 5C:
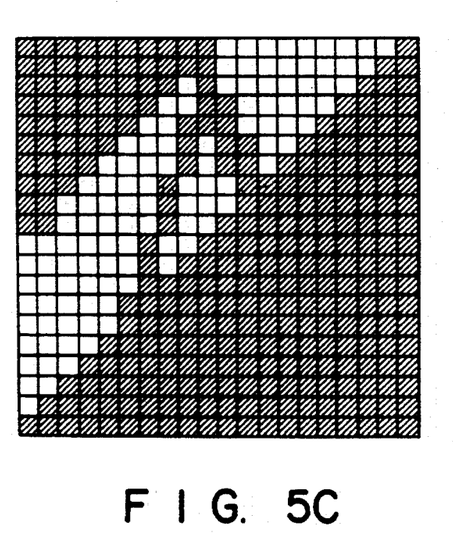
Figure 5D:
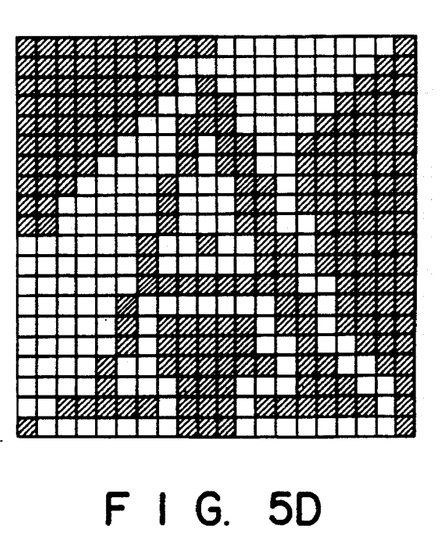

FIG. 5C shows the logical sum of dot pattern data of a code frame of FIG. 5A and dot pattern data of a photo frame of FIG. 5B As can be seen from this example, when two pieces of data are simply ORed to superimpose the code frame upon the photo frame, they cannot be distinguished from each other. In the present embodiment, therefore, the dot pattern of the code frame is fringed as shown in FIG. 5D so as to allow two pieces of data to be distinguished from each other. That is, in FIG. 5C, blank areas each of one dot are provided around the dot pattern data of the code frame, the dot pattern data of the photo frame corresponding to the blank areas are masked and the resultant dot pattern data of the code and photo frames are ORed. Hence the blank areas each of one dot are created along the boundary between the code frame data and the photo frame data, thus permitting discrimination between two pieces of data.

Figure 6:
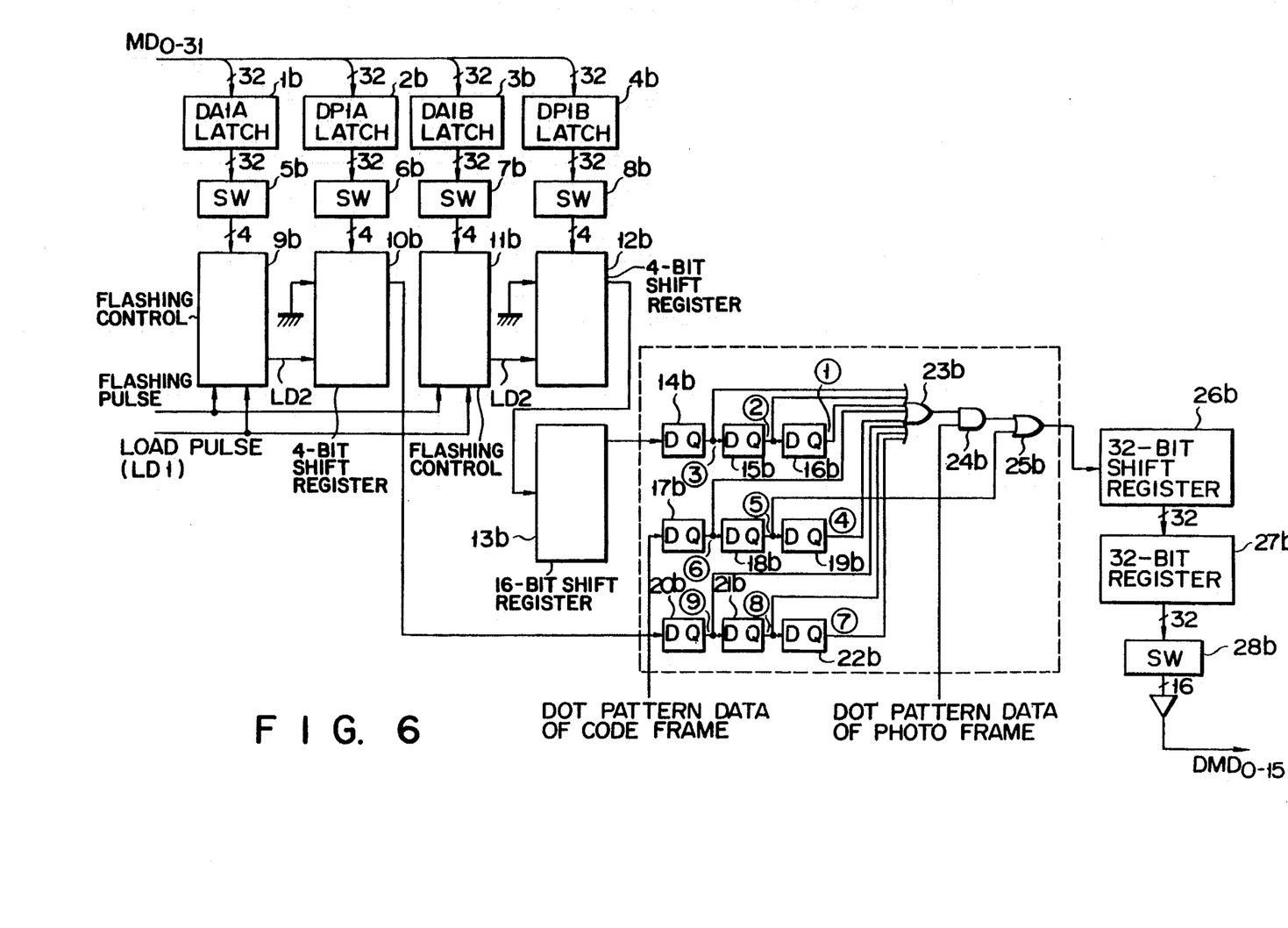
FIG. 6 illustrates a circuit arrangement of the LCD data converting section of FIG. 2.

In FIG. 6, there is illustrated a specific arrangement of LCD data converting subsection D-3. Dot pattern data DP1B and DP1A and flashing data DA1B and DA1A of a code frame for lines of one line before and after the present line are sequentially read out of SRAM 7 at times shown in FIG. 4 and then held in latch circuits 4b, 2b, 3b and 1b, respectively. Each of succeeding switch circuits 5b, 6b, 7b and 8b converts the 32-bit latched data in a corresponding latch circuit to 4-bit data in miniblock (4 dots×4 dots) units. The converted dot pattern data DP1A and DP1B are supplied to 4-bit shift registers 10b and 12b, respectively. controller 9b and 11b control the supply of a load pulse LD2 to 4-bit shift registers 10b and 12b in accordance with flashing data DA1A and DA1B and a flashing pulse. A 16-bit shift register 13b compensates for the time difference in the data resulting from a difference in the timing of readout between dot pattern data DP1B of one line before and dot pattern data DP1A of one line behind, that is, establish synchronization between DP1A and DP1A.

Figure 7:
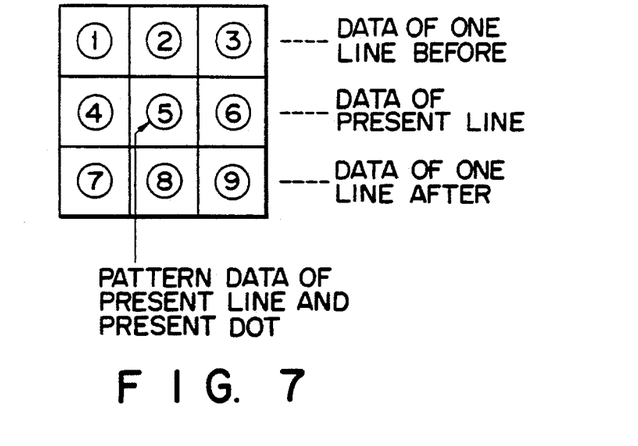
FIG. 7 illustrates the operation of the LCD data converting section.

In FIG. 6, a portion enclosed with dotted lines is adapted to reduce one-dot data around the dot pattern data of a code frame to blank data, to mask the dot pattern data of a photo frame and to OR the masked dot pattern data with the dot pattern data of the code frame. As shown in FIG. 7, reducing one-dot data around the dot pattern data ⑤ of the code frame and masking the dot pattern data of the photo frame means that, if an array of 3×3 pixels surrounding the dot pattern data ⑤ of the present dot on the present line of the photo frame has dot pattern data of the code frame representing brightness, then the dot pattern data ⑤ of the photo frame is masked. More specifically, if at least one of pixels ①, ②, ③, ④, ⑥, ⑦, ⑧, ⑨ has dot pattern data, the dot pattern data on the center pixel ⑤ is masked. Hence dot pattern data of a code frame corresponding to three lines of the present line and the upper and lower lines need to be read out.

In FIG. 6, D flip-flops 14b to 22b are adapted to latch data of nine pixels ① to ⑨ of FIG. 7, respectively. An 8-input NOR 23b decides whether at least one of eight pixels of FIG. 7, exclusive of pixel ⑤, have dot pattern data or not. In accordance with the result of this decision the dot pattern data of the photo frame is masked. An 2-input OR gate 25b ORs the masked output with the dot pattern data of the code fame.

The data synthesized in this way is then converted to 32-bit data by a 32-bit shift register 26b and a 32-bit register 27b. The 32-bit data is divided into two pieces of 16-bit data for time-division multiplexing by a switch circuit 28b and the resulting 16-bit data is applied to data bus DMD0-15 of DRAM 8. Writing the 16-bit data into DRAM 8 is carried out by section (E) of FIG. 2.

It is to be noted here that the flashing control of the dot pattern data DP1B and DP1A on the lines of one line before and after the present line is performed for varying the fringing state in accordance with the flashing state. That is, if no flashing control were performed for the dot pattern data DP1B and DP1A, the fringing would be done even in the flashing-off state. As a result, in the example of FIGS. 5A to 5D, an image in which "A" is excluded from FIG. 5D would be obtained. As in the present embodiment, on the other hand, if the flashing control is performed for the dot pattern data DP1B and DP1A, the fringing will not be done when the flashing is off. Consequently, an image in which "A" is excluded from FIG. 5C, namely, an image of FIG. 5B which is to be displayed primarily can be obtained.

It is needless to say that, although not shown in FIG. 6, the dot pattern data DP1 and DP2 of code and photo frames for the present line are subjected to the flashing control.

Figure 8:
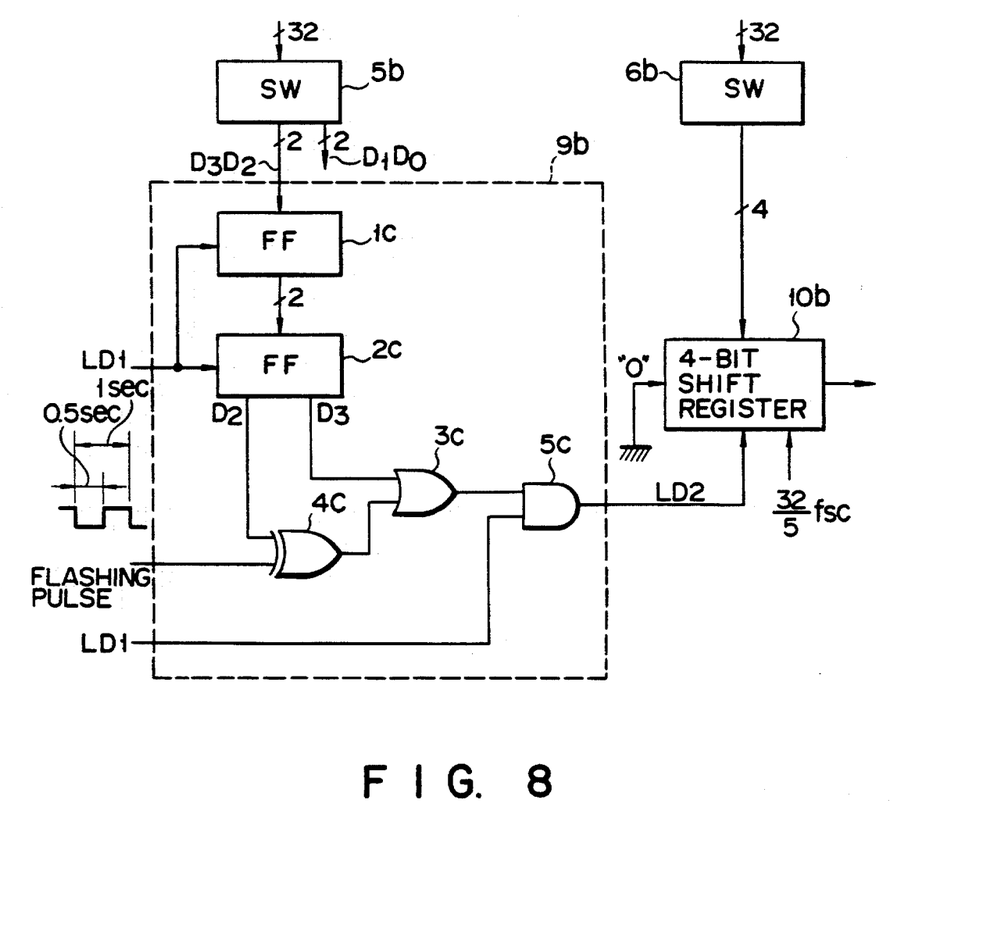
FIG. 8 shows a circuit arrangement of the flashing control section of FIG. 6.
Figure 9:
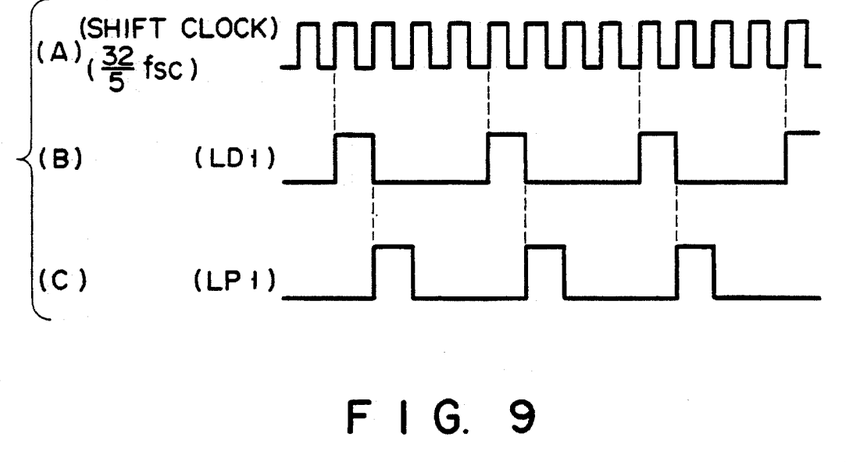
FIG. 9 is a timing diagram explanatory of the operation of the flashing control section.

A description will now be given of a specific arrangement of flashing controllers 9b and 11b with reference to FIGS. 8 and 9A to 9C. FIG. 8 illustrates a circuit arrangement of flashing controller 9b, while FIGS. 9A to 9C are timing charts explanatory of the operation of the circuit of FIG. 8.

In FIG. 8, 4-bit flashing data DA1A is output from switch circuit 5b as described above. When the bits of flashing data DA1A are represented by D3, D2, D1 and D0, the high-order two-bit data D3 and D2 are used for flashing control. More specifically, the most significant bit data D3 is used to specify whether flashing control is to be done or not. D3=1 when flashing control is not to be done, otherwise D3=0. Data D2 is used to specify either positive-phase flashing or opposite-phase flashing. D2=0 for positive-phase flashing, while D2=1 for opposite-phase flashing. Data D3 and D2 are applied to an OR circuit 3c and an EXCLUSIVE OR circuit 4c, respectively, via timing flip-flop circuits 1c and 2c.

Assuming now that D3=1, the output of OR circuit 3c is always "1". Thus a load pulse LD1 passes through an AND circuit 5C to enter a 4-bit shift register 10b as a load pulse LD2. Consequently, 4-bit dot pattern data DP1A is loaded from switch circuit 6b into shift register 10b. The data is output serially one bit at a time in accordance with shift clocks (display clocks) shown in FIG. 9A.

As described above, when D3=1, load pulse LD2 is applied to shift register 10b irrespective of a flashing pulse supplied to EXCLUSIVE OR circuit 4c with the result that the flashing is not performed.

Next, when D3 and D2 are both 0, the flashing pulse is applied to AND circuit 5c via EXCLUSIVE OR circuit 4c and OR circuit 3c. In this case, therefore, load pulse LD1 passes through AND circuit 5c only when flashing pulse is 1 to serve as load pulse LD2. When the flashing pulse is 0, on the other hand, AND circuit 5c produces no load pulse LD2. Namely, when the flashing pulse is 1, dot pattern data DP1A is loaded into 4-bit shift register 10b for conversion to serial data. On the other hand, when the flashing pulse is 0, dot pattern data DP1A is not loaded into 4-bit shift register 10 with the result that 0s are shifted through shift register 10b. This results in masking of dot pattern data DP1A output from switch circuit 6b.

As described above, when data D3 and D2 are both 0, the positive-phase flashing state results in which the flashing is off when the flashing pulse is 1 and the flashing is off when the flashing pulse is 0.

For example, the flashing pulse has a cycle period of one second and a duty factor of 50%. Thus the flashing is switched at 0.5-sec intervals.

Finally, when D3 and D2 are both 0, EXCLUSIVE OR circuit 4c serves as an inverter so that the flashing pulse is inverted. In this case, therefore, it is when the flashing pulse is 0 that load pulse LD2 is applied to 4-bit shift register 10b. As a result, the opposite-phase flashing state is obtained in which the flashing is off when the flashing pulse is 1, while the flashing is on when the flashing pulse is 0.

Latch pulse LP1 for flip-flop circuits 1c and 2c and load pulse LD1 are each generated every four shift clocks.

The arrangement of flashing controller 9b was described above. The other flashing controller 11b is identical in arrangement to flashing controller 9b and thus its description is omitted.

Figure 11:
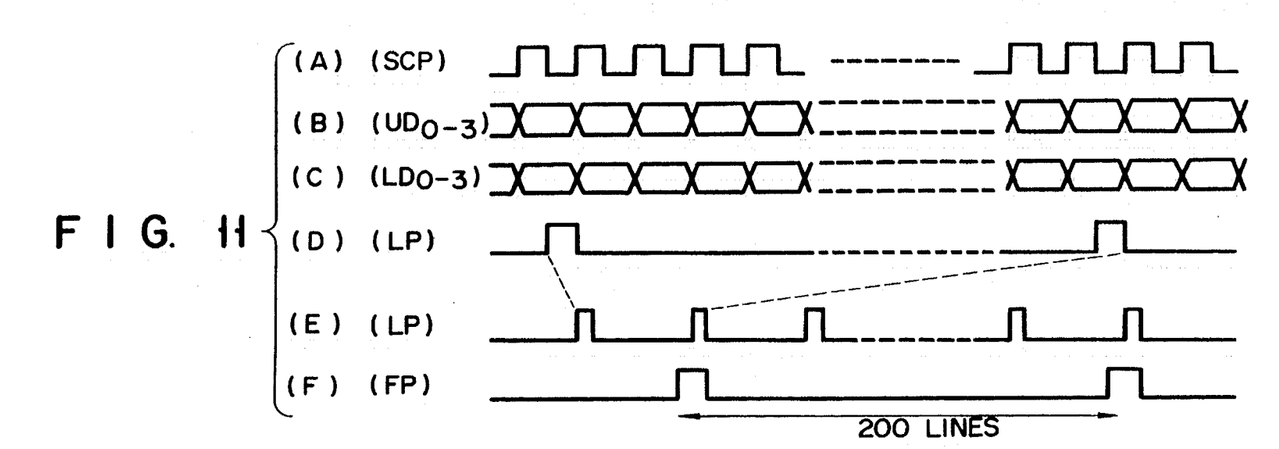
FIGS. 11 and 12 are timing diagrams explanatory of the operation of the display control section.

Referring back to FIG. 2, the (E) section is a DRAM control section for carrying out the general control off DRAM 8. An LX counter E-1 and an LY counter E-2 produce various control signals necessary to drive LCD 10. Here an interface to LCD (module) 10 will be described briefly. LCD 10 with 640×400 pixels is usually driven in two parts. That is, 400 pixels along a vertical line are divided into two parts each of 200 pixels. Four-bit data UD0-3 and four-bit data LD0-3 are simultaneously applied to the upper 640×200 pixel part and the lower 640×200 pixel part, respectively. SCP is a clock for the 4-bit data, LP ia a signal representing a cycle of LCD 10 along its horizontal line, and FP is a signal representing a cycle of LCD 10 along its vertical line. The timing diagrams of these signals are shown in FIGS. 11A to 11F. With LCD 10 a frame rate of about 70 Hz is standard. If the frame rate were slower, the flicker would become noticeable, while if the frame rate were faster, the liquid crystal medium could not respond. In the present embodiment, the basic clock is 32/5 fsc (22.9 MHz). Assuming that the cycle period of clock pulse SCP is equal to the basic cycle period (eight times the 32/5 fsc clock cycle) and one horizontal line covers not 640 pixels but 768 pixels, then the frequency of signal LP becomes about 14.915 KHz. Since 200 LP signals corresponds to one cycle of signal FP defining one cycle of vertical scan, the frequency of signal FP becomes about 74.57 Hz (roughly 70 Hz). From the foregoing, assuming the basic cycle to be a minimum unit, LX counter E-2 may be a modulo-192 counter. Although LY counter E-2 is a modulo-200 counter, since the header area of LCD 10 comprises not 24 lines but 16 lines as described above, the LY counter is preferably a modulo-200 counter from 8 to 207. Thus, the header area corresponds counts of 8–23, and the display area corresponds to counts of 24–207 so that the display addresses for LCD 10 conveniently coincide with the display addresses for CRT 9.

DRAM address control & LCD control subsection E-3 comprises a portion for producing addresses to DRAM 8 and a portion for producing various control signals to LCD 10. The control signals for LCD 10 include horizontal and vertical scan signals LP and FP, which are produced by decoding counts of LX counter E-1 and LY counter E-2. The addresses to DRAM 8 comprise addresses used in writing dot pattern data which are read out of SRAM 7 and synthesized into DRAM 8, the addresses used when CPU 3 accesses DRAM 8 to read .data therefrom and write data thereinto, and the display addresses used for displaying data on LCD 10. The write addresses from SRAM 7 to DRAM 8 are applied from address switcher B-3 to DRAM address control & LCD control subsection E-3. The addresses for access to DRAM are applied from D-RAM access control subsection E-4 to DRAM address control &LCD control subsection E-3. The display addresses are applied from LX counter E-1 and LY counter E-2 to DRAM address control & LCD control subsection E-3.

Figure 10:
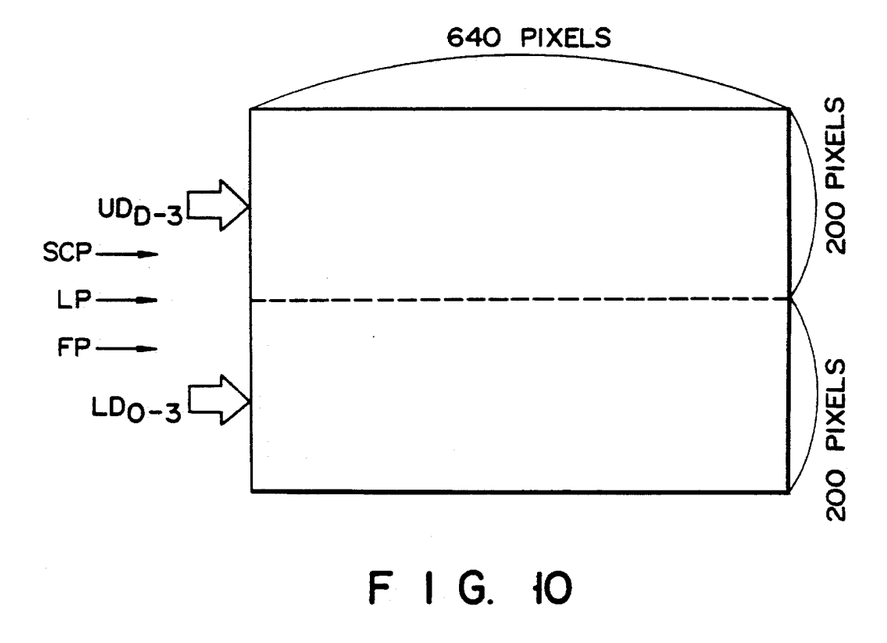
FIG. 10 is a diagram explanatory of the operation of the display control section.
Figure 12:
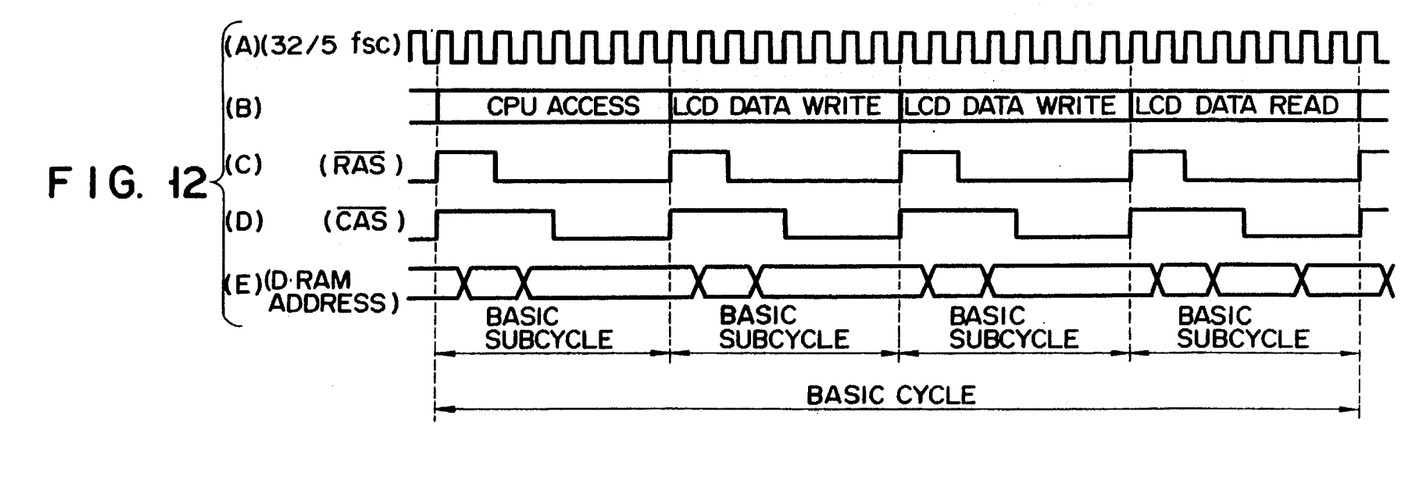

The timing diagrams of the DRAM addresses and RAS and CAS signals are shown in FIGS. 12A to 12E. The CPU access period of FIG. 12B is a period during which CPU 3 reads from or write into DRAM 8. In this period the addressed from CPU 3 are latched by DRAM access control subsection E-4 for subsequent application to DRAM address control & LCD control subsection E-3. Data writing by CPU 3 into DRAM 8 is carried out in units of 8 bits and 8-bit data is transferred to DRAM data bus DMD 0-7 or DMD 8-15 according to its address. At the same time write pulses DWR0 and DWR1 are made active according to the address. DWR0-1 is provided from DRAM access control subsection E-4. LCD data write is repeated two times consecutively. If CPU 3 detects the completion of the process of LCD data converting subsection D-3, data is written into DRAM 8 during those periods. The 32-bit data produced by LCD data converting subsection D-3 during those periods are time divided into two parts each of 16 bits and output onto DRAM data bus DMD0-15. The write address is applied from address switcher B-3 to DRAM address control & LCD control subsection B-3 and then output onto DRAM address bus DMA0-8 as a row address and a column address in accordance with the timing shown in FIG. 10. At the same time the write pulses DWR0-1 go active together. It is only during data of the display area, exclusive of the header area, are processed by LCD converting subsection D-3 that automatic writing of data is performed. The data of header area are directly written into DRAM 8 by CPU 3.

The CPU data read period is a period during which data are read out of DRAM 8 so as to display the data on LCD 10. Since, in this case, data divided into two upper and lower parts are needed to be applied simultaneously to LCD 10, two pieces of 16-bit data are needed to be read out during this period. To this end the present embodiment utilizes the static column mode. That is, addresses along a vertical line (counts of LY counter E-2) are supplied as column addresses, the first addresses being those of 8–207 lines and the next addresses being addresses of 208–407 which are offset by 200 with respect to 8–207. Hence, data for the upper half of LCD 10 are read out by row addresses and the first column addresses, and data for the lower half of LCD 10 are read by the second column addresses. Each piece of 16-bit data is applied to LCD data converting subsection E-5 and converted to data units each of 4 bits (UD0-3, LD0-3) for subsequent application to LCD 10. Since the writing of data from SRAM 7 into DRAM 8 is carried out during 32 clock periods of 32/5 fsc, failure in data writing will never occur.

As described above, the present embodiment is provided with CPU 3 for processing image data to be displayed, SRAM 7 for storing image date for CRT 9, DRAM for storing image data for binary type LCD 10 and display control section 6 for controlling SRAM 7 and DRAM 8 in partial association with each other. For display control for CRT 9, display control section 6 stores image data resulting from conversion of transmitted image data to data for CRT 9 by CPU 3 therein, writes it into SRAM 7 and then reads out the data stored in SRAM 7 in sync with the display timing of CRT 9. For display control for LCD 10, on the other hand, display control section 6 converts image data read out of SRAM 7 to be displayed on CRT 9 data for LCD 10 in sync with the timing of readout of the image data, writes it into DRAM 8 in accordance with the readout address of SRAM 7, and reads it out of DRAM 8 in sync with the timing of display of LCD 10.

According to such an arrangement, display control section 6 need not be provided for CRT 9 and LCD 10 separately and has only to carry out controls for CRT 9 and LCD 10 in partially associated manner. Thus, the complication of software and an increase in amount of hardware can be prevented.

More specifically, with respect to the prevention of complication of software, CPU 3 has only to carry out data conversion process for CRT 9. Thus, the software for CPU 3 may be substantially the same as software for a display control device for controlling only a conventional CRT or active matrix LCD and may be simple irrespective of controlling both CRT 9 and LCD 10.

Next, the reasons for the prevention of an increase in amount of hardware will be listed as follows:

① Since the address of data read out of SRAM 7 for display is used as the address of DRAM 8 into which the data is to be written, the need for an address generating means on the LCD side is eliminated.

② Since CPU 3 performs data conversion process on the CRT side, a circuit for monitoring the data conversion processing state may be provided only on the CRT side.

③ In an attempt to erase image data stored in an image memory with hardware, erasing image data in SRAM 7 will result in erasing data stored in DRAM 8 because data read from SRAM 7 is written into DRAM 8. Thus, hardware erasing subsection C-1 may be provided only the CRT side.

④ Since SRAM 7 and DRAM 8 are made equal to each other in the basic cycle for access thereto, the need for a buffer circuit for preventing failure in writing data into DRAM 8 is eliminated. In writing data read out of SRAM 7 into DRAM 8, the present invention reads dot pattern data (① to ⑨ of FIG. 7) of the present dot and surrounding display dots in the case of a code frame, reads the dot pattern data (⑤ of FIG. 7) of the present dot in the case of a photo frame, decides whether or not the dot pattern data of surrounding dots of the present dot have brightness, masks the dot pattern data of the present dot (⑤ of FIG. 7) when they have brightness, and finally combines the masked output and the dot pattern data of the present dot (⑤ of FIG. 7) of the code frame together.

According to the above arrangement, because the dot pattern data of the photo frame surrounding the dot pattern of the code frame is masked, the code and photo frames can be distinguished from each other in spite of the fact that the code and photo frames are displayed one above the other.

In this case, the dot pattern data DP1B and DP1A (①, ②, ③, ⑦, ⑧, ⑨) of line before and after the present line of the code frame are subjected to the flashing control. Thus, no deficiencies due to fringing will occur at a time of flashing. That is, if the fringing were done when the flashing were off, "A" would be excluded from the image of FIG. 5D. This can be prevented so that such an original image as shown in FIG. 5B may be obtained.

Although an embodiment of the present invention has been described in detail, the present invention is not limited to the specific embodiment.

For example, in the previous embodiment, use is made of a double scan monitor as CRT 9, but a 1H:24 KHz monitor used with personal computers may be used instead in the present invention. In this case, LP for LCD 10 should be modified to accommodate 640 pixels and FP may be 70 Hz.

In the embodiment described previously, although use is made of SRAM 7 and DRAM 8 as image memories, other memories may be used instead.

Furthermore, the previous embodiment was described with respect to the case where the present invention was applied to a videotex system. It is needless to say that the present invention may be applied to display control of other systems.

As described above, the present invention can control two types of display devices which are different in type of data to be handled and driving method with the aid of simple software and a small amount of hardware. In videotex system, widely used binary type LCDs can be used in addition to CRTs or active matrix type LCDs. Code and photo frames can be distinguished from each other even if they are displayed one above the other.

What is claimed is:

1. A videotex terminal system comprising:

reception means for receiving a videotex system data signal supplied from a communication line and for converting the data signal into digital data;

processing means for decoding the digital data supplied from the reception means in accordance with a predetermined protocol, to thereby obtain first image data, said first image data having a code frame and a photo frame, each of said code frame and said photo frame including dot pattern data, foreground color data, background color data and flashing data regarding the present line dot pattern data and flashing data regarding a preceding line which is one line before the present line, and dot pattern data and flashing data regarding a succeeding line which is one line after the present line, and wherein said code frame includes first brightness data and said photo frame includes second brightness data;

first memory means for storing said first image data;

second memory means for storing second image data;

cathode ray tube display means for displaying an image responsive to RGB signals presented at an input of said cathode ray tube display means;

binary-type liquid crystal display means for displaying an image responsive to LCD signals presented at an input of said binary-type liquid crystal display means; and display control means for:

a) writing the first image data obtained by the processing means in the first memory means;

b) reading out both code-frame image data and photo-frame image data from the first memory means at display timings used for the cathode ray tube display means;

c) synthesizing the code-frame image data and photo-frame image data into single frame image data;

d) converting the single frame image data into said RGB signals, and then supplying the RGB signals to the cathode ray tube display means;

e) preparing second image data for the binary-type liquid crystal display means on the basis of the dot pattern data included in the code-frame and photo-frame image data read out from the first memory means;

f) writing the second image data in the second memory means asynchronously with the display timings used for the cathode ray tube display means;

g) reading out the second image data from the second memory means at display timings used for the binary-type liquid crystal display means;

h) decoding the readout second image data; and i) supplying the decoded second image data to the binary-type liquid crystal display means as said LCD signals;

wherein said display control means includes:

display data generating means, for generating said second image data for a given line, said display control means being responsive to said dot pattern data and said flashing data of lines which are one line before and one line after said given line, and for selectively including in said second image data a fringe portion between first and second portions of said second image data representative of said code frame and said photo frame, respectively, based on a state of flashing data of at least one of said code frame and said photo frame, data holding means for holding the first brightness data corresponding to said amount of brightness at a present display position and surrounding display positions adjacent to the present display position, and for holding the second brightness data comprising data corresponding to said amount of brightness at the present display position and surrounding display positions, brightness determination means for determining whether the first brightness data corresponding to the surrounding display positions adjacent to the present display position held in said data holding means indicates brightness in said display positions, brightness data mask means for masking the second brightness data corresponding to the present display position when said brightness determination means determines the first brightness data to indicate brightness in said surrounding display positions, and data combining means for combining the second brightness data exclusive of a portion masked by said brightness data mask means with the first brightness data corresponding to the present display position held in said data holding means.

2. A videotex terminal system according to claim 1, wherein said display control means further comprises access control means for controlling a predetermined access to said first memory means.

3. A videotex terminal system according to claim 1, wherein said display control means further comprises erase means for controlling a predetermined hardware erasing to said first memory means.

4. A display controller according to claim 1, wherein said data holding means comprises:

flashing data holding means for holding flashing data read out by said display control means;

flashing state determination means for determining flashing states of the first and second brightness data synchronized with a timing of display on the basis of the flashing data held in said flashing data holding means; and flashing mask means for masking corresponding first and second brightness data when said flashing state determination means determines the flashing to be off.

5. A videotex terminal system according to claim 1, wherein said display data generating means selectively provides said fringe portion based on a state of flashing data in said code frame.

* * * * *